(12) United States Patent
Friesen et al.

(10) Patent No.: US 8,205,347 B2
(45) Date of Patent: Jun. 26, 2012

(54) LOADER TOOL LEVEL INDICATOR

(75) Inventors: Henry Friesen, Niagra-on-the-Lake (CA); Alison M. Smith, Stoney Creek (CA)

(73) Assignee: Deere & Company, Moline, IL (US)

(*) Notice: Subject to any disclaimer, the term of this patent is extended or adjusted under 35 U.S.C. 154(b) by 75 days.

(21) Appl. No.: 12/915,404

(22) Filed: Oct. 29, 2010

(65) Prior Publication Data

US 2012/0102768 A1    May 3, 2012

(51) Int. Cl.
*G01C 9/00* (2006.01)
(52) U.S. Cl. ............................... 33/365; 33/374; 33/645
(58) Field of Classification Search .................... 33/365, 33/370, 371, 374, 375, 521, 645, 282
See application file for complete search history.

(56) References Cited

U.S. PATENT DOCUMENTS

| | | | | |
|---|---|---|---|---|
| 2,565,615 | A * | 8/1951 | McCoy | 33/370 |
| 3,012,537 | A * | 12/1961 | Thiel | 33/370 |
| 3,678,885 | A * | 7/1972 | Ferguson | 33/370 |
| 3,883,021 | A * | 5/1975 | Wilhelm | 33/370 |
| 4,288,056 | A * | 9/1981 | Bergstrom | 33/365 |
| 4,604,025 | A * | 8/1986 | Hammoud | 33/521 |
| 5,058,294 | A * | 10/1991 | Bryan, Jr. | 33/365 |
| 7,036,235 | B1 * | 5/2006 | Cohen | 33/371 |
| 2002/0038514 | A1 * | 4/2002 | Tufariello | 33/371 |
| 2004/0255481 | A1 * | 12/2004 | Haynes | 33/645 |

* cited by examiner

*Primary Examiner* — G. Bradley Bennett

(57) ABSTRACT

A tool level indicator is provided. The tool level indicator has a rod sliding in a coiled wire cylinder, with one end having an enlarged helical hook that can be slid onto an actuator barrel when at a substantial right angle to the actuator, then tightens on the actuator barrel as the coil is rotated and attached to the upper actuator pin. The upper coils are spaced such that a particular set of closely wound coils indicates a first tool level at ground and a second particular set of closely wound coils indicates a second tool level at ground when the tip of the rod aligns with the second particular set of closely wound coils.

10 Claims, 4 Drawing Sheets

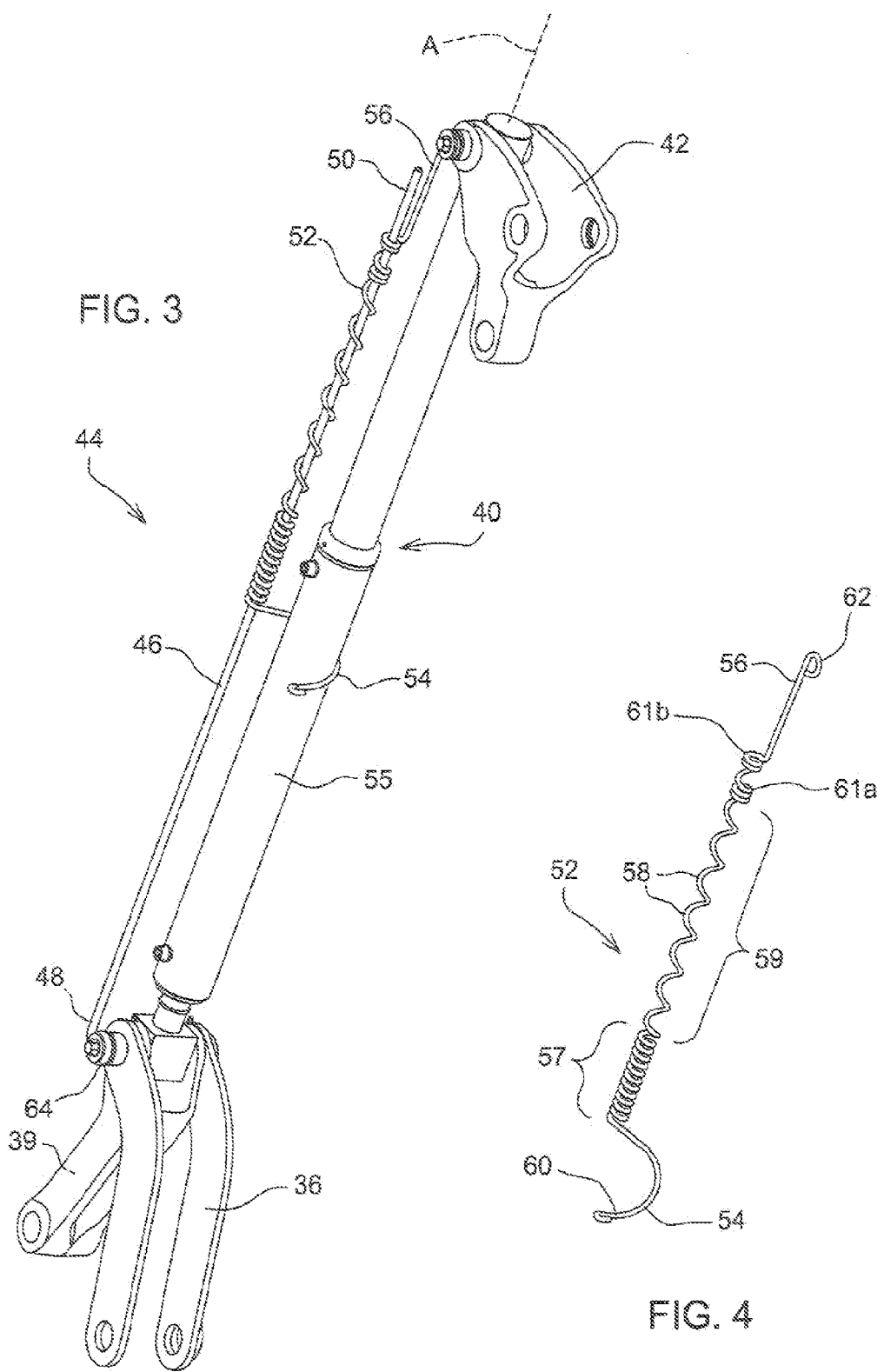

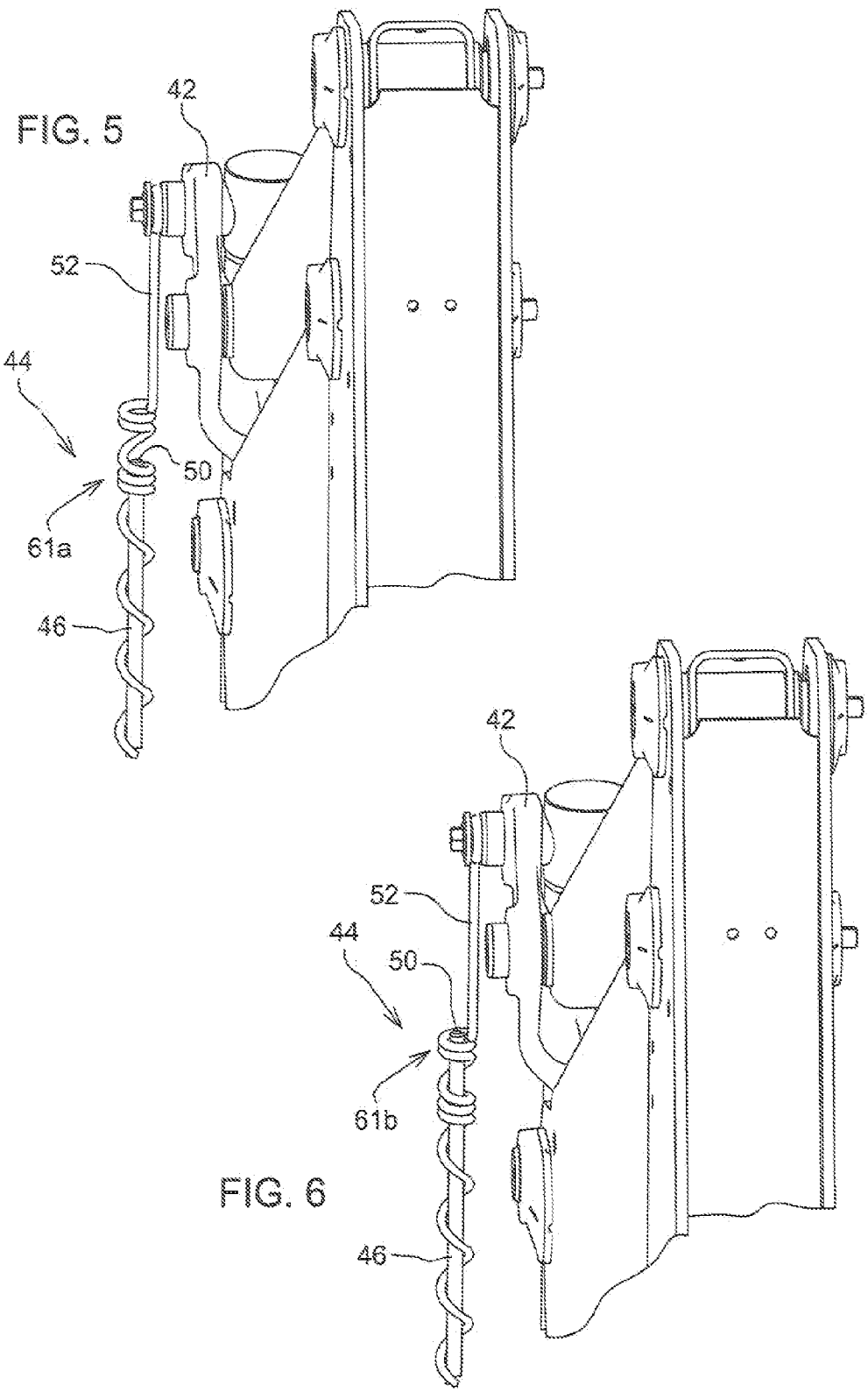

LOADER TOOL LEVEL INDICATOR

FIELD OF THE INVENTION

The invention herein concerns implements mounted to work machines. More particularly, the invention concerns loader implements adapted for mounting on the front of a tractor. Specifically, the invention concerns devices for indicating the level of a tool attached to such loader implements.

BACKGROUND OF THE INVENTION

It is known to provide work machines such as tractors with a variety of implement attachments for accomplishing different tasks, for example it is well known to mount a loader implement to the front of a tractor. When operating a front loader implement from the operator station of a tractor it is sometimes difficult for the operator to determine whether the tool affixed to the loader is level or not. Thus loaders are commonly fitted with some means of indicating tool level. Various styles of tool level indicators are known such as bent rods disposed thru a hoop, a rod in a tube, or a kinked rod thru a slot in a bracket. Some known loaders have linkages to indicate tool level at any height. Tool level indicators must also be adjustable to indicate level at ground for a variety of tools such as buckets or pallet forks. There are a number of issues that have been encountered with known designs. More particularly, with the rod style it has been found that the rod is not sturdy enough and can be bent easily.

With the bracket on actuator type designs they need to be adjustable for bucket or pallet fork and depending on design can be difficult to keep tight and are unsightly. Further they must be sized for various actuator sizes. Additionally the rod is necessarily long and sticks above the boom when the tool is fully rolled back and the location where the operator views the indicator is lower down making it more difficult to see. With the rod-in-tube style designs when the tool is left in a dumped position in the winter, water can collect and freeze in the tube causing the rod to bend when rolling back the tool. Further, the operator can only see that the tool is approaching level in one direction. With most tool level indicators the parts tend to rattle because of the loose fit between rod and bracket.

Accordingly, there is a clear need in the art for an improved tool level indicator that overcomes the problems seen in prior art designs.

SUMMARY OF THE INVENTION

In view of the foregoing it is a first object of the invention to provide a tool level indicator that is readily visible to the operator and clearly indicates tool level at ground.

Another object of the invention is to provide a tool level indicator that does not stick above the boom as high as previously known designs.

Still another object is to provide a tool level indicator that eliminates the accumulation of moisture and thus damage due to freezing.

A further object is to provide a tool level indicator wherein the rod can be seen approaching level from either direction.

Yet another object is to provide a tool level indicator that has a simple attachment to the actuator and can be designed to accommodate various actuator sizes without requiring clamps.

Still another object is to provide a tool level indicator that eliminates rattling issues found in other designs.

A further object is to provide a tool level indicator where there is no need for continuous adjustment.

These and other objects of the invention are satisfied by a tool level indicator arrangement for a loader implement, the loader implement having a tool affixed thereto and an actuator for dumping and rolling back the tool, the actuator having a head end and a rod end, the indicator arrangement comprising: an indicator coil, the indicator coil having a plurality of helical coils, a first end of the indicator coil being affixed to a barrel of the actuator and a second end being affixed commonly with the head end of the actuator; and, an indicator rod, a first end of the indicator rod being affixed commonly with the rod end of the actuator and a portion of the indicator rod being disposed within the coils of the indicator coil; wherein a second end of the indicator rod is aligned with one of a particular one of the plurality of helical coils of the indicator coil and a particular set of closely wound indicator coils when the tool affixed to the loader implement is in a level position at ground.

In general a loader tool level indicator is provided. The tool level indicator has a rod sliding in a coiled wire cylinder, with one end having an enlarged helical hook that can be slid onto an actuator barrel when at a substantial right angle to the actuator, then tightens on the actuator barrel as the coil is rotated and attached to the upper actuator pin. The upper coils are spaced such that a particular set of closely wound coils indicates a first tool level at ground when the tip of the rod aligns with the first particular set of closely wound coils and a second particular set of closely wound coils indicates a second tool level at ground when the tip of the rod aligns with the second particular set of closely wound coils.

BRIEF DESCRIPTION OF THE DRAWINGS

For a complete understanding of the objects, techniques, and structure of the invention reference should be made to the following detailed description and accompanying drawings, wherein:

FIG. 3 is a perspective view of a tool level indicator arrangement according to the invention;

FIG. 4 is a perspective view of the indicator coil of the tool level indicator arrangement of FIG. 3;

FIG. 5 is a view of a portion of the loader showing the tool level indicator in a first position indicating the level position of a first tool; and, FIG. 6 is a view of a portion of the loader as in FIG. 5 showing the tool level indicator in a second position indicating the level position of a second tool.

DESCRIPTION OF THE PREFERRED EMBODIMENT

Figure 1:
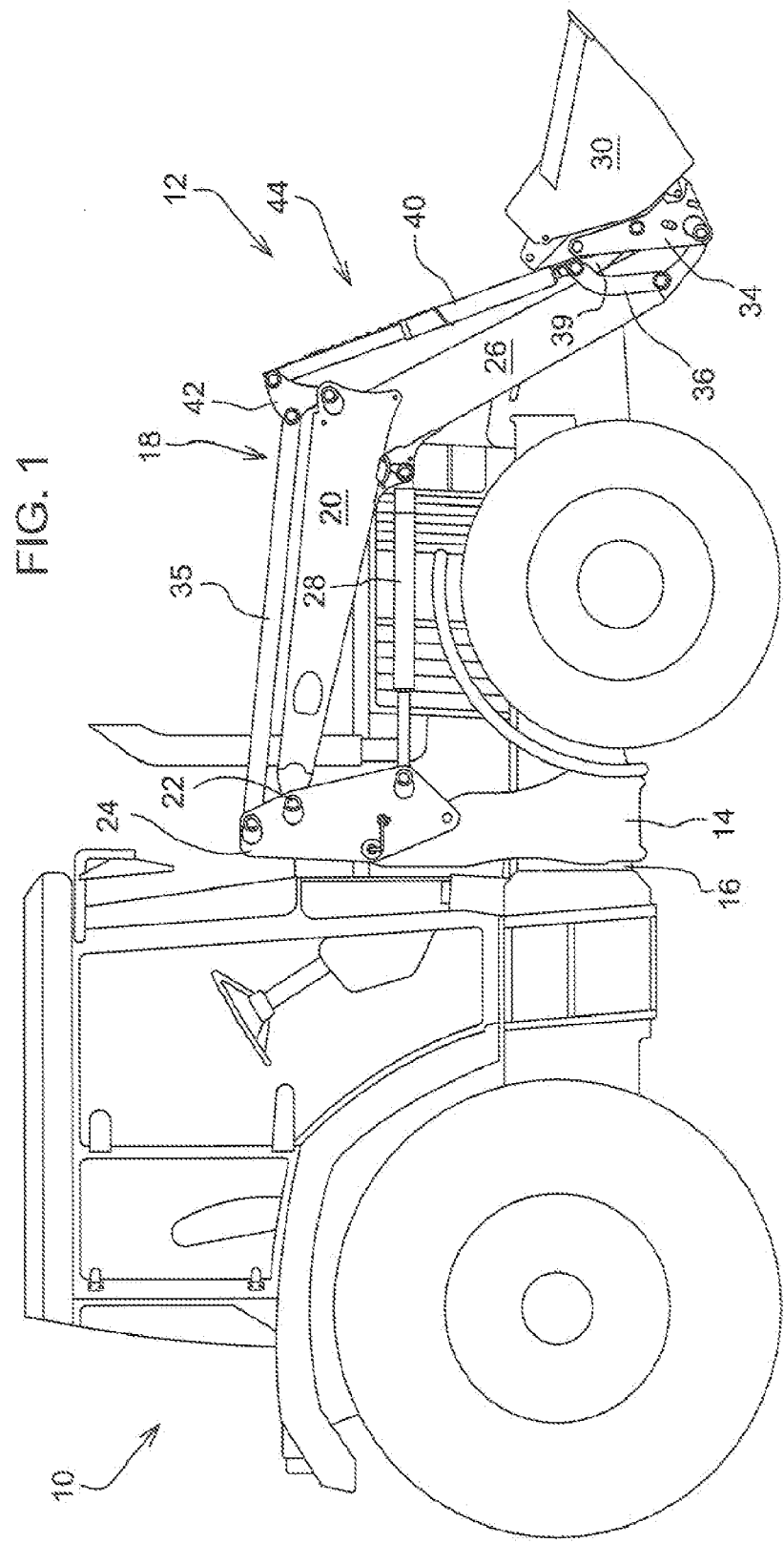
FIG. 1 is a side view of a work machine in the form of a tractor having a front mounted loader implement.
Figure 2:
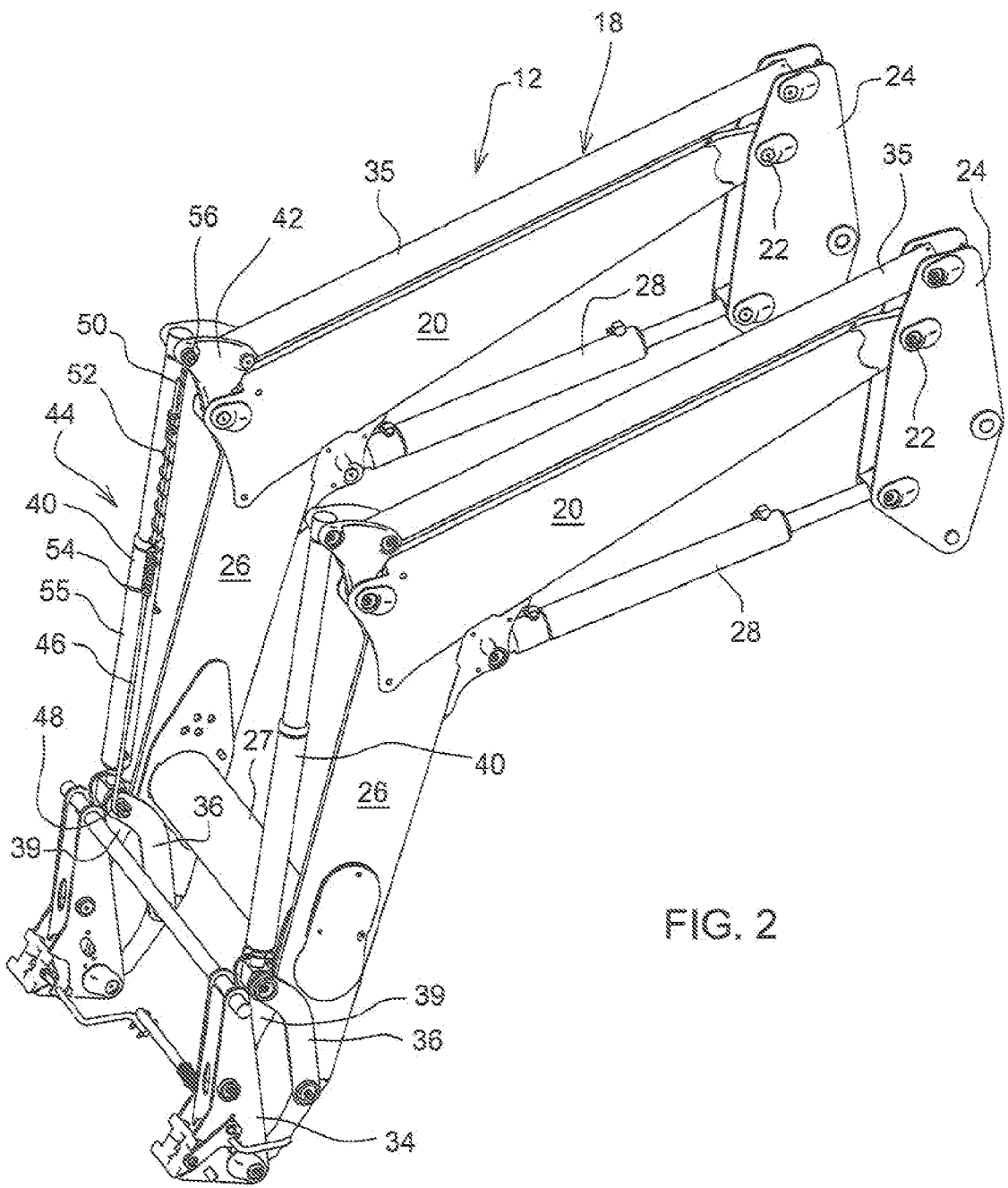
FIG. 2 is a perspective view of a loader implement according to the invention.

Referring now to FIGS. 1 and 2 it can be seen that a work machine in the form of a tractor 10 is provided with a front mounted loader implement 12. As shown the tractor 10 is provided with a pair of mounting frames 14 (only one of which is shown) which are bolted or otherwise affixed to a frame 16 of the tractor 10. The loader 12 is of a conventional configuration including a loader boom comprising transversely spaced, right and left, parallel loader arms 18, with which the boom in a lowered position, as viewed in FIG. 1, respectively includes upper arm sections 20 projecting forwardly from, and having rear ends respectively pivotally mounted, as at connection pins 22, to right and left masts 24. Forward ends of the right and left upper arm sections 20 extend forwardly and are respectively coupled to upper ends of lower arm sections 26, which extend downwardly and forwardly so as to define an angle with the upper arm sections 20. Extending between, and joining the lower arm sections 26 at locations spaced upwardly from lower ends of the arm sections is a cross member defined by a cylindrical torque tube 27. Coupled between the mast 24 and the junction between the upper and lower arm sections 20 and 26, respectively, is a lift actuator 28.

Mounted to a lower front location of the lower arm sections 26 is a tool, here shown as a loader bucket 30 in FIG. 1, with the bucket 30 extending transversely and having transversely spaced mounting hooks (not shown), at its back side for receiving coupling pin portions of a carrier and latching device 34. Right and left leveling linkages 35, are coupled between the masts 24 and bell cranks 42. Attached to one corner of the bell crank 42 is the head end of a hydraulic actuator 40 whose rod end is pivotally attached to one end of drive links 36. The other end of the drive links 36 are attached to the lower arm sections 26. In the configuration shown a connecting link 39 is provided that is also connected at one end to the rod end of the actuator 40 and at its other end to the carrier and latching device 34. Thus the extension and retraction of the actuator 40 serves to roll the tool between dump and rolled back positions.

The loader 12 described thus far is conventional in its configuration. In the description that follows the unique tool level indicator of the invention will be described in more detail. With continued reference to FIGS. 1 and 2 and now also to FIG. 3, it can be seen that the tool level indicator assembly is generally indicated by the numeral 44. As shown the assembly is comprised of an indicator rod 46 that is affixed at a first end 48 to the rod end of the actuator 40. A second end 50 of the indicator rod 46 is slidingly disposed within an indicator coil 52 that is affixed to the actuator 40. As will be described in more detail below the indicator coil 52 is affixed at its first end 54 to the barrel 55 of the actuator 40 while its second end 56 is affixed commonly with the head end of the actuator 40.

With reference now to FIG. 4 the indicator coil 52 can be seen in more detail. More particularly, it can be seen that the indicator coil 52 is preferably formed of a unitary length of round rod material that is formed for most of its length into a plurality of helical coils 58. For reasons detailed below a first portion 57 of the helical coils 58 is closely spaced while a second portion 59 of the helical coils is more widely spaced. Further the indicator coil 52 is also provided, as shown, with two sets of closely wound coils 61a and 61b proximal to the second end 56 of the indicator coil 52. A first end 54 of the indicator coil 52 has an enlarged helical coil that forms a helical hook 60. For reasons which will become apparent, the helical hook 60 has an interior dimension of a size to allow it to slidingly pass over a barrel 55 of the actuator 40. At its second end 56 the indicator coil 52 is formed into an eyelet 62.

The indicator rod 46 as shown in FIG. 3 is formed from a generally straight length of round rod material and has an attaching eyelet 64 provided at its first end 48.

As shown in FIGS. 2 and 3 the tool level indicator assembly 44 is mounted to the loader 12 by placing the helical hook 60 of the indicator coil 52 over the barrel 55 of the actuator 40 at a substantial right angle to the lengthwise axis A of the actuator 40. The indicator coil 52 can then be rotated and sprung so that it is substantially parallel to the lengthwise axis A of the actuator 40 and secured to a common mounting point with the head end of the actuator 40 via the eyelet 62. The first portion 57 of closely wound coils facilitates the rotation of the indicator coil 52 for mounting inasmuch as the more closely wound coils allow for greater flexibility than more widely spaced coils provide. The tension created as a result of the sprung mounting of the indicator coil 52 serves to secure the helical hook 60 to the barrel of the actuator 40. As such the indicator coil 52 is secured against movement at both ends with the coils 58 of the indicator coil 52 being helically arranged around a lengthwise axis that is generally parallel to the lengthwise axis A of the actuator 40. The indicator rod 46 is in turn disposed so that it is slidingly journaled in the coils 58 of the indicator coil 52 with its first end 48 being secured at a common mounting point with the rod end of the actuator 40 via the eyelet 64. Because the indicator coil is affixed to a common mounting point with the head end of the actuator and the indicator rod is affixed to a common mounting point with the rod end of the actuator 40, the indicator rod 46 slides inside the indicator coil 52 as a result of movement due to the extension/retraction of the actuator 40. As will be described in more detail below the relative position of the indicator rod 46 within the indicator coil 52 serves as a visual indication of the position of the drive links 36 and therefore the carrier and latching device 34 and tool affixed thereto such as a bucket 30.

With reference now to FIG. 5 the operation of the tool level indicator assembly 44 becomes clear. More particularly, it should be noted that the indicator rod 46 can be manufactured to a particular length such that its second end 50 aligns with an upper coil of a particular set of closely wound coils 61a, for example, of the indicator coil 52 when the tool is in the level position at ground. It is also possible to manufacture the indicator rod 46 in a way as to make it adjustable in length, for example by way of a telescoping arrangement or other appropriate means so as to allow for adaptation of the tool level indicator arrangement for different types of tools that might be mounted at different angles. Because the second end of the indicator rod 46 and the sets of closely wound coils 61a and 61b are located relatively high on the loader, the position of the rod relative to the sets of closely wound coils is readily visible to the operator from the operator station of the tractor. The visibility can further be enhanced by the use of contrasting colors on the indicator rod 46 and indicator coil 52. Because of the substantially open nature of the indicator coil 52, the operator can observe the movement of the indicator rod 46 within the indicator coil 52 so as to more readily determine when the tool is approaching level both when the tool is being dumped or rolled back. The open nature of the indicator coil 52 also prevents the accumulation of moisture as experienced with known rod-in-tube designs and thereby alleviates the problem of freezing. Further, the sprung mounting of the indicator coil to the actuator allows some variability in the size of the actuator barrel while still allowing the coil to be soundly secured to the loader inasmuch as the helical hook can be made to loosely fit over the actuator barrel when not sprung.

Another feature of the indicator assembly is the ability to use different sets of closely wound coils 61a and 61b of the indicator coil 52 as level reference points for different tools. For example, as shown in FIG. 5 the first set of closely wound coils 61a can be used to indicate a level position at ground for a first tool such as a bucket, and as shown in FIG. 6 a different set of closely wound coils 61b can be used to indicate the level position of another tool other than a bucket, such as pallet forks, wherein the position of the rod end of the actuator, and thus the indicator rod relative to the coils at the level position at ground of the pallet forks, is different than the position of the rod end of the actuator at the level position of the bucket at ground.

The drawing figures illustrate, and thus the description of the drawings disclose, a loader implement having a mechanical self-leveling capability and a carrier and latching device. It should however be understood that the tool level indicator described above is equally applicable to loaders without mechanical self-leveling capabilities and without carrier and latching devices. In such cases the actuator may be mounted between the loader boom and the tool differently than described above but the tool level indicator would still be mounted commonly with the actuator as described.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A tool level indicator arrangement for a loader implement, the loader implement having a tool affixed thereto and an actuator for dumping and rolling back the tool, the actuator having a head end and a rod end, the indicator arrangement comprising:
    an indicator coil, the indicator coil having a plurality of helical coils, a first end of the indicator coil being affixed to a barrel of the actuator and a second end being affixed commonly with the head end of the actuator; and,
    an indicator rod, a first end of the indicator rod being affixed commonly with the rod end of the actuator and a portion of the indicator rod being disposed within the coils of the indicator coil;
    wherein a second end of the indicator rod is aligned with one of a particular one of the plurality of helical coils of the indicator coil and a particular set of closely wound indicator coils when the tool affixed to the loader implement is in a level position at ground.

2. A tool level indicator arrangement according to claim 1, wherein the indicator coil has, at its first end, a hook adapted to engage a barrel of the actuator.

3. A tool level indicator arrangement according to claim 1, wherein the indicator coil has at its second end an eyelet.

4. A tool level indicator arrangement according to claim 1, wherein the indicator rod has at its first end an eyelet.

5. A tool level indicator arrangement according to claim 2, wherein the hook is loosely fit over the barrel when the second end is not secured commonly with the head end of the actuator and is rotated and sprung securely to the barrel when the second end is secured commonly with the head end of the actuator.

6. A tool level indicator arrangement according to claim 5, wherein the hook is a helical hook.

7. A tool level indicator arrangement according to claim 1, wherein the second end of the indicator rod is aligned with another one of a particular one of the plurality of helical coils of the indicator coil and a particular set of closely wound indicator coils when a different tool affixed to the loader implement is in a level position at ground.

8. A tool level indicator arrangement according to claim 1, wherein the second end of the indicator rod and one of a particular one of the plurality of coils and a particular set of closely wound indicator coils are visible to an operator from an operator station of a work machine to which the loader implement is affixed.

9. A tool level indicator arrangement according to claim 1, wherein the indicator rod is adjustable in length.

10. A tool level indicator arrangement according to claim 1 wherein a portion of the indicator coil has coils that are closely wound and a portion of the indicator coil has coils that are spaced apart.

* * * * *